(12) United States Patent
Andersen

(10) Patent No.: US 7,840,872 B2
(45) Date of Patent: Nov. 23, 2010

(54) N-DIMENSIONAL ITERATIVE ECC METHOD AND APPARATUS WITH COMBINED ERASURE—ERROR INFORMATION AND RE-READ

(75) Inventor: Ketil Qvam Andersen, Oslo (NO)

(73) Assignee: O-Mass AS, Olso (NO)

(*) Notice: Subject to any disclaimer, the term of this patent is extended or adjusted under 35 U.S.C. 154(b) by 1079 days.

(21) Appl. No.: 11/545,668

(22) Filed: Oct. 10, 2006

(65) Prior Publication Data

US 2008/0098280 A1    Apr. 24, 2008

(51) Int. Cl.
*H03M 13/00* (2006.01)
(52) U.S. Cl. .................................. 714/758; 714/752
(58) Field of Classification Search ................ 714/752, 714/758
See application file for complete search history.

(56) References Cited

U.S. PATENT DOCUMENTS

| | | | |
|---|---|---|---|
| 5,251,077 A | 10/1993 | Saitoh | |
| 6,920,005 B2 | 7/2005 | Yun | |
| 2005/0149819 A1* | 7/2005 | Hwang | 714/758 |

FOREIGN PATENT DOCUMENTS

| | | |
|---|---|---|
| EP | 1 069 569 A3 | 6/2005 |
| JP | 20000-57510 A | 2/2000 |

* cited by examiner

*Primary Examiner*—Sam Rizk
(74) *Attorney, Agent, or Firm*—Schiff Hardin LLP

(57) ABSTRACT

In an iterative error correction method and apparatus for correcting errors in digital data read from a storage medium, re-reads are combined with the error correction procedure in a single error recovery procedure. The data read from the storage medium are represented as a multi-dimensional data structure, and the error recovery procedure is undertaken for each dimension of the data structure. In each dimension, an erasure map is generated that contains errors in the initial read of the data for that dimension, and the errors in the erasure map are deducted as they are corrected in subsequent re-reads. After a predetermined number of re-reads, or when no further errors exist, the error recovery procedure is ended.

14 Claims, 8 Drawing Sheets

FIG. 2A

C - denotes symbols that are correctable in the iterative ECC process after error deduction in S1

FIG. 2B

C3 sub data set and C3 code word

N-DIMENSIONAL ITERATIVE ECC METHOD AND APPARATUS WITH COMBINED ERASURE—ERROR INFORMATION AND RE-READ

BACKGROUND OF THE INVENTION

1. Field of the Invention

The present invention concerns a method and an apparatus for improved re-try error recovery for tape storage drives. The method and apparatus are based on an n-dimensional array of symbols (typically bytes) that are ECC coded with a symbol correcting code (typically an RS code) in each dimension (product code scheme).

2. Description of the Prior Art

When a storage system, such as a tape storage system, reads data from a storage medium, such as tape, erroneous data will be received occasionally because of defects in the medium, tape debris, etc. When erroneous data are detected by an error detection system, an attempt is made to correct the data, or to test the data to determine if the data can be corrected. If the correction process is not successful, the tape must be rewound, and data have to be read again. This is referred to as a re-read. After the re-read is performed, the error detection and error correction process is repeated. The re-read process and the ECC process are performed a predetermined number of times. If the error cannot be corrected after the predetermined number of tries, the data cannot be recovered and the error is referred to as a "fatal" error. The re-read and ECC processes have conventionally been performed as two separate processes for tape storage systems.

U.S. Pat. No. 6,920,005, however, discloses combining the re-read process for a storage apparatus with the error correction process. In the procedure disclosed in the U.S. Pat. No. 6,920,005, the performance of a current error recovery operation is compared with the performance of a previous error recovery operation. This is accomplished by applying parameters to the recovery process, and comparing the performance, such as channel statistics, of the recovery operation with those of a previous recovery operation, and then adding parameters.

SUMMARY OF THE INVENTION

An object of the present invention is to improve combined re-read and ECC processes by introducing more than one dimension for a dataset into the ECC process. The use of one than more dimension for a dataset in the ECC process provides the opportunity for more sophisticated error decoding procedures, such as iterative ECC decoding, wherein decoding is performed in each dimension iteratively until no new errors can be recovered, or until some other stop criterion is satisfied or reached. Introducing n-dimensional code layout, wherein n is an integer greater than one, also provides the opportunity to merge the re-read process and the ECC process into a single process in a more sophisticated manner with better data recovery probability.

Instead of comparing the performance of a current error recovery operation with a previous error recovery operation, the system and method in accordance with the invention compare the result of the correction process, namely an error map. An error map is a map encompassing erroneous symbols in the dataset. The result for the current correction process, namely the error map, may be different from the result of a previous correction process because of randomly-distributed errors or variations in debris for each re-read pass. The performance of the process itself is not measured, and the parameters in the process are not modified or added.

In accordance with the inventive method and apparatus, correctable symbol error positions are monitored in each re-read pass. In each re-read pass, the number of symbol errors and symbol error positions may vary depending on the SNR level in the channel, and the amount of debris on the tape. The parameters in the channels, such as off-track values, MR bias values, AGC parameters, etc., are not adjusted for each re-read pass. Instead, the inventive method and apparatus are based on natural variations in error positions for the symbols protected by the ECC code. The aforementioned error map with variable error positions is constructed, and the iterative correction process is performed. In the inventive method and apparatus, parameters are not applied or added in the recovery process. Instead, after each comparison, the error map is updated by deducting symbol errors from the error map, and overriding the corresponding erroneous data symbols with correct data symbols.

DESCRIPTION OF THE DRAWINGS

FIGS. 1A, 1B, 1C, 1D, 2A and 2B illustrate respective examples of error maps for explaining the method in accordance with the present invention.

DESCRIPTION OF THE PREFERRED EMBODIMENTS

Errors received when reading data from a storage medium typically include two different error types, namely random errors related to SNR in the channel and tape debris, and media defect errors. The media defect will be constant for a given dataset, but the random errors will vary each time the dataset is read.

As track width and bit length decrease, and more channels are introduced in tape storage products, the amount of SNR-related errors will increase compared to the number of errors caused by media defects. The SNR-related errors are randomly distributed. This means that when reading the same dataset twice, the amount of errors caused by SNR will be approximately the same, but it can be expected that there will be a variation in the error positions. The errors caused by media defects will have the same error positions from one read to another. The probability of successfully re-reading an uncorrectable dataset and obtaining a better sample of the dataset, which can be corrected, will be smaller as the percentage of randomly distributed SNR-related errors increases in the system.

To compensate for this problem and improve the data recovery success, re-reads can be combined with the ECC process into a single error recovery process. Additionally, using an iterative product code, such as an n-dimensional Reed-Solomon code, for error correction in combination with the re-read process, improved correction capabilities can be obtained, compared to conventional methods employing a separate re-read process and error correction process. Although Reed-Solomon (RS) codes are used as an example, the improvement achieved by the method described herein can be obtained using other symbol-correcting product codes other than n-dimensional RS codes, such as LPDC codes.

In accordance with the invention, an n-dimensional code, such as a Reed-Solomon code, is combined with an iterative decoding algorithm suitable for "cross probing" and correcting erroneous symbols in the n dimensions. The method and device according to the invention are based on the concept of reducing symbols in an erasure map, meaning that a conventional erasure map is initially generated, and non-erroneous (OK) symbols are deducted from the map as the symbols are corrected by the ECC system.

Figure 1A:
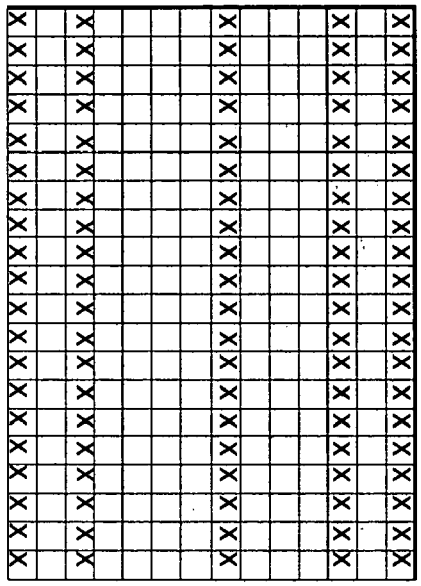

An overview of the inventive method is as follows:

An uncorrectable dataset is read from a storage medium. Optionally, an initial error map is constructed from a CRC check or a quick syndrome check. The dataset and the corresponding initial error map are stored in a memory structure S1. An example of such initial error map in that S1 is shown in FIG. 1A.

Figure 1B:
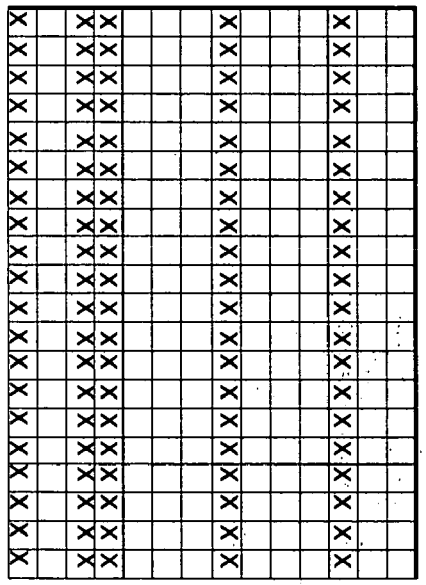
Figure 1C:
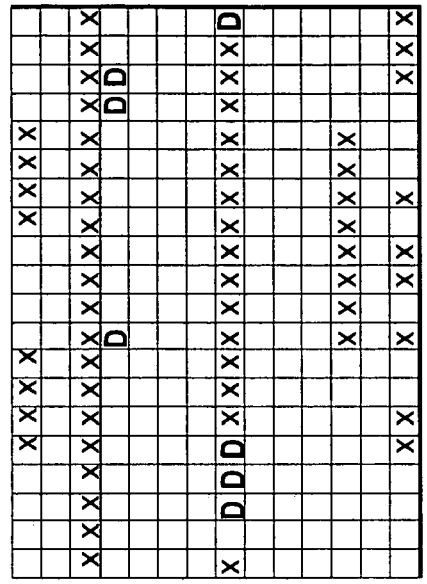
Figure 1D:
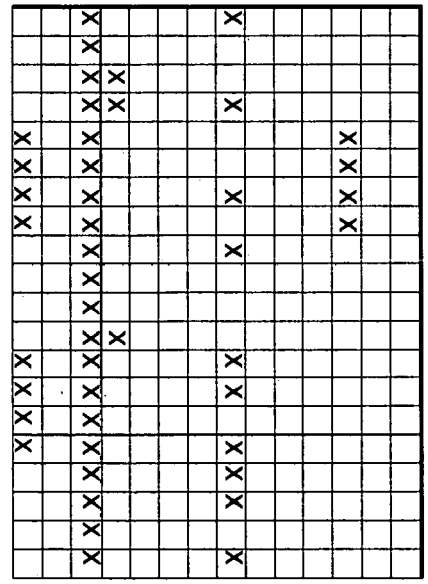

The iterative decoding and correction algorithm is performed on S1 in all dimensions, designated below as dimensions C1, C2 and C3, until a predetermined stop criterion is satisfied. An error map of the remaining errors in S1 is constructed. An example of such an error map is shown in FIG. 1B. The dataset is re-read from the medium and stored as a second data structure S2. An initial error map in S2 after the re-read is shown in FIG. 1C. The iterative decoding algorithm is performed on S2, and an error map of the remaining errors in S2 is constructed. Such an error map in S2 is shown in FIG. 1D. The error maps in S1 and S2 are compared. OK data from S2 which are marked as bad in S1, are transferred from S2 to S1, and the S1 error map is updated by deducting the errors corrected in this manner. Such an updated error map is shown in FIG. 2A.

The iterative decoding algorithm is again performed on S1. If there are new successful corrections, the S1 error map is again updated. Such a further updated error map is shown in FIG. 2B.

The method then loops back to another re-read and the process is again repeated a predetermined number of times, or the process is exited if no errors are left in S1.

The inventive method is explained as an iterative algorithm in three dimensions C1, C2 and C3. The algorithm can be expended, however, to more than three dimensions. The three-dimensional dataset used in the example is formed for ECC code words in each dimension, and thus forms a three-dimensional cube with encoded data. This cube is referred to herein as the dataset.

A code word is defined as the smallest amount of data that can be encoded or decoded by the ECC that is selected for use. A code word consists of data and parity symbols.

A C1 code word is formed by symbols in the x-dimension in the cube. A C2 code word is formed by symbols in the y-dimension in the cube, and a C3 code word is formed by symbols in the z dimension in the cube.

Figure 3:
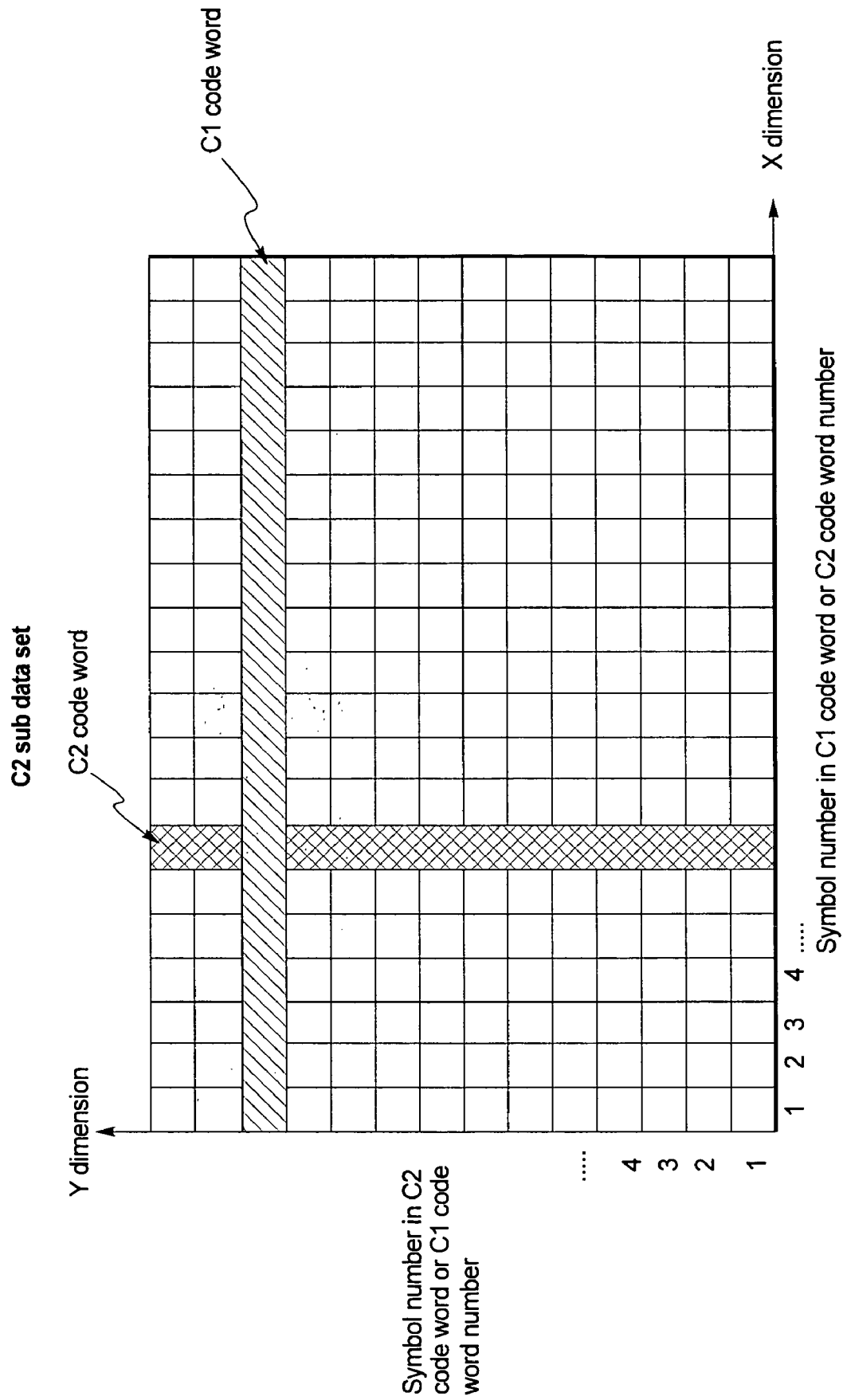
FIG. 3 illustrates a C2 sub-dataset with C2 and C1 code words.

A "slice" through the cube is shown in FIG. 3, representing a C2 sub-dataset. The C2 sub-dataset is defined as a dataset formed by C2 and C1 code words and represents and square area in the x-y plane. The number of C2 datasets equals the number of symbols in a C3 code word.

Figure 4A:
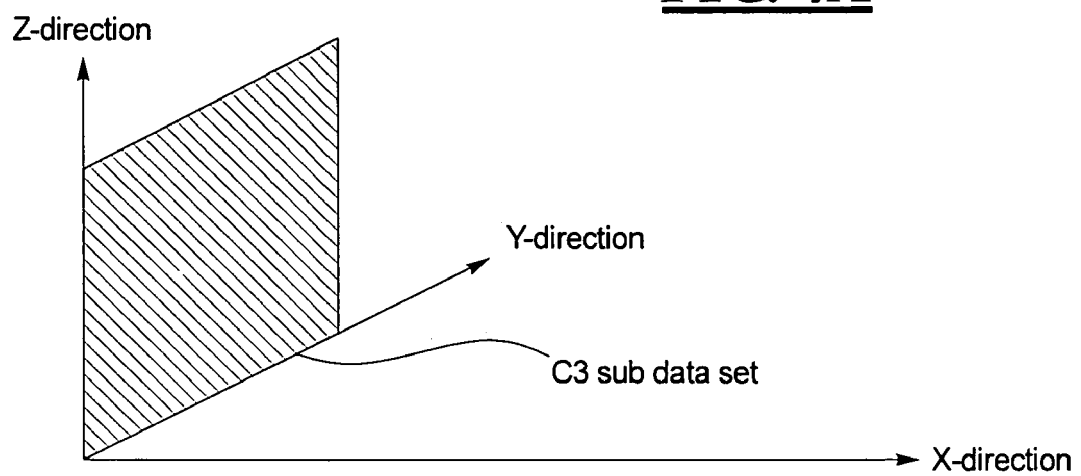
FIGS. 4A and 4B illustrate a C3 sub-dataset with a C3 code word.
Figure 4B:
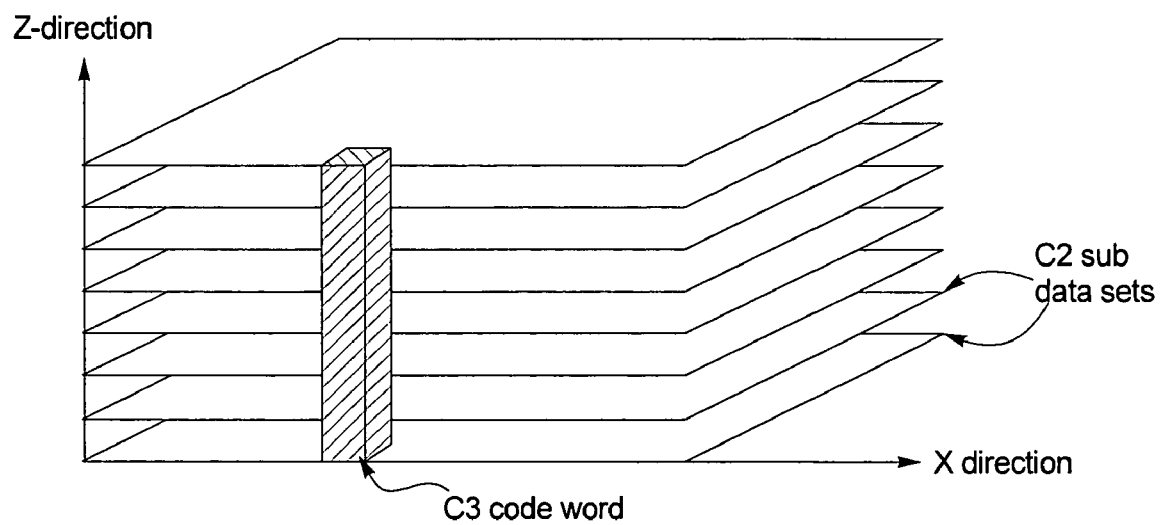

A C3 sub-dataset is defined as a dataset formed by C3 and C2 code words, and equals a square in the y-z plane. The number of C3 sub-datasets equals the number of symbols in a C1 code word, as illustrated in FIGS. 4A and 4B.

A syndrome check (or additional CRC check) in the C1 dimension for the C1 code words is used as erasure information for the C2 dimension. The information is used to construct the initial erasure map.

As used herein, "erasure" means symbol faults in a code word where the positions of the faulty symbols are known. The faulty positions are used as error positions from code words in another dimension in the cube. The term "symbol error" as used herein means an error in a code word that requires the decoding algorithm to decode the faulty positions in the code word with the use of the symbol information in the code word itself.

The algorithm begins with an initial erasure map. The code words in the different dimensions are then decoded with error detection and correction, and an error map is generated by removing symbol error positions from the erasure map. The new error map is used as an input to an erasure decoding algorithm, and a correction process, in the different dimensions.

The algorithm makes use of one map for both error and erasure information. It is the use of the map in the decoding method and error or erasure decoding that allows a determination to be made whether the information omitted from the map is erasure information or error information.

Figure 5:
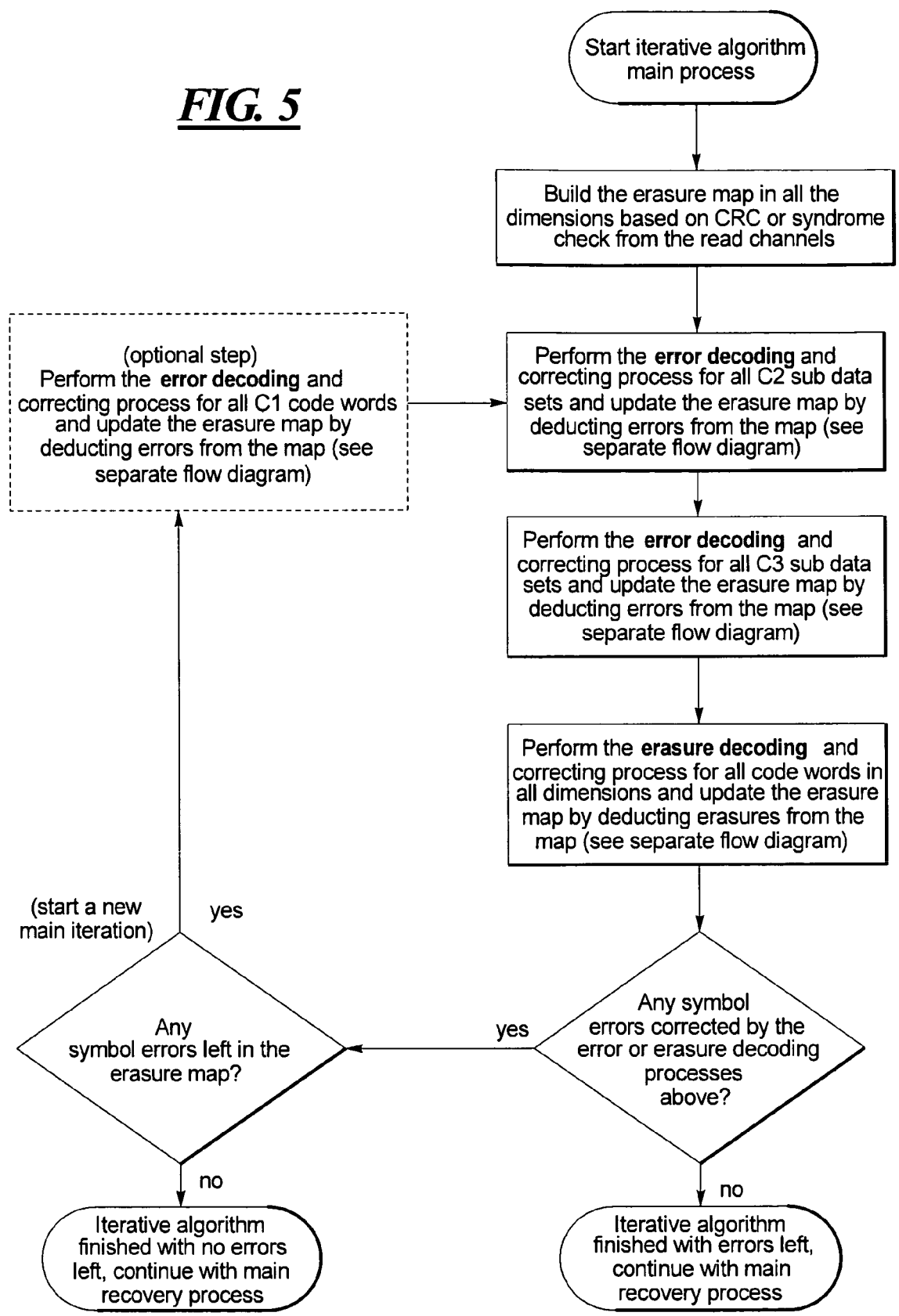
FIG. 5 is a flowchart for an embodiment of the main process in the iterative algorithm in accordance with the present invention.

FIG. 5 shows further details of the main iterative algorithm. After starting the algorithm, an erasure map is constructed in all dimensions based on CRC or a syndrome check from the read channels. In the next step, error decoding is performed and the correction process is undertaken for all C2 sub-datasets. The erasure map is updated by deducting errors from the map. Details of the deduction procedure are set forth in FIG. 6.

Next, error decoding and correcting is performed for all C3 sub-datasets, and the erasure map is updated by deducting errors from the map.

The erasure decoding and correcting are performed for all code words in all remaining directions, and the erasure map is updated.

If there are any symbol errors corrected by the aforementioned error and erasure decoding process, a check is made as to whether any symbol errors are left in the erasure map. If the answer to this inquiry is "yes," then the algorithm loops back to the error decoding and correcting for all C2 sub-datasets, and the algorithm is again iterated.

Optionally, before beginning the error decoding and correcting process for all C2 sub-datasets in this next iteration, the error decoding and correcting can be performed for all C1 code words, and the erasure map can be updated by deducting errors there from.

If there are no symbol errors left in the erasure map, the iterative algorithm is ended, and the main recovery process is continued. This is also the result if the answer to the preceding inquiry regarding symbol errors corrected by the error or erasure decoding processes is "no."

Figure 6:
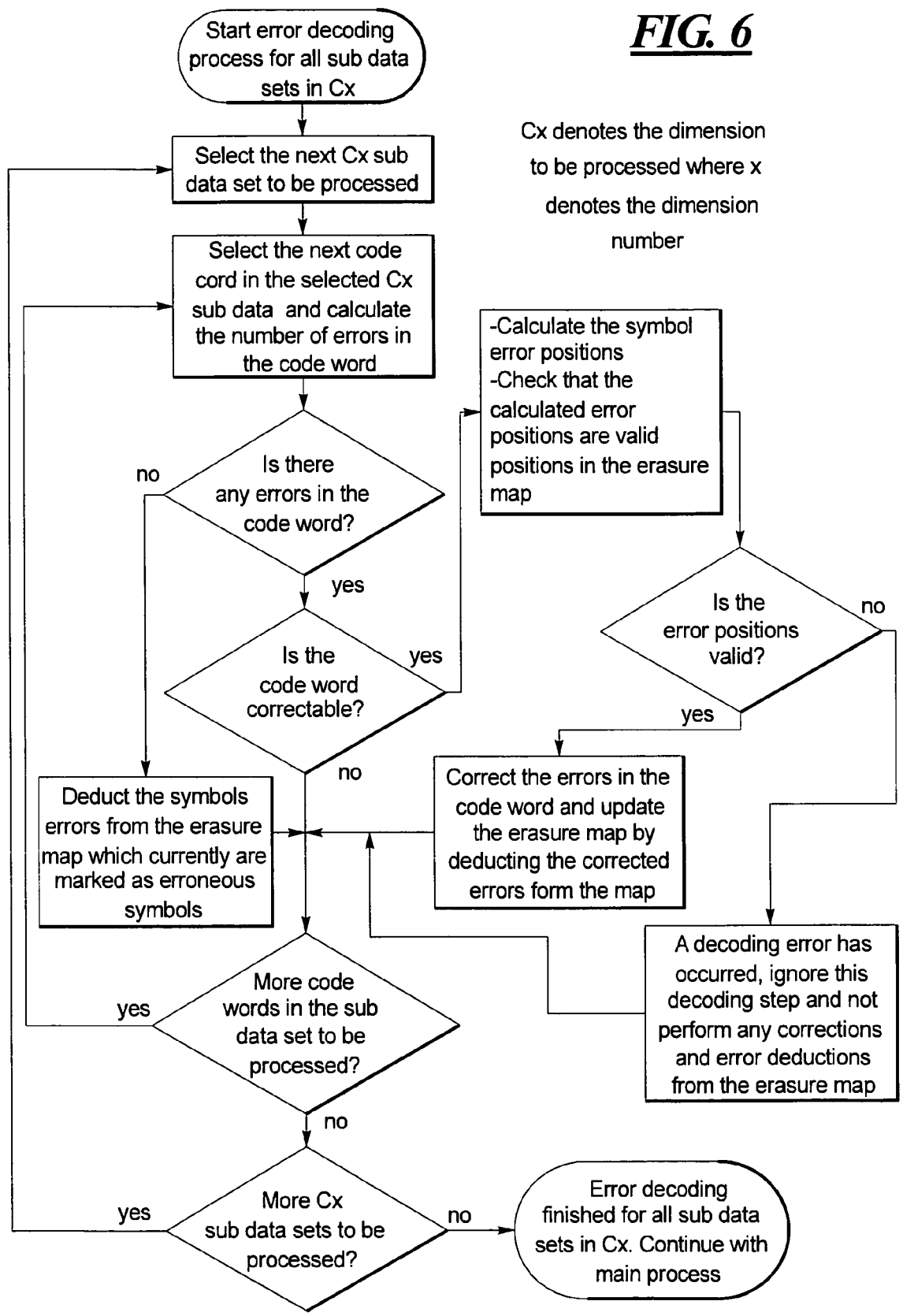
FIG. 6 is a flowchart of an embodiment of the error decoding sub-process in the inventive iterative algorithm.

A flowchart for the error decoding process is set forth in FIG. 6, which applies to all dimensions and is therefore described generically for sub-datasets Cx. A Cx sub-dataset to be processed is selected, and the next code word in the selected sub-dataset is selected, and the number of errors in that code word is calculated. An inquiry is made as to whether there are any errors in this code word. If the answer is "yes," another inquiry is made as to whether the code word is correctible, If the answer is "no," then an inquiry is made as to whether there are more code words in the sub-dataset to be processed.

If the answer to the inquiry of whether there are any errors in the code word is "no," then the symbol errors are deducted from the erasure map which are currently marked as erroneous symbols, and the algorithm also proceeds to the aforementioned inquiry as to whether there are more code words in the sub-dataset to be processed. If the answer to that inquiry is "yes," the algorithm loops back to select the next code word, and the aforementioned procedure is repeated. If the answer to that inquiry is "no," then an inquiry is made as to whether there are more Cx datasets to be processed. If the answer is "yes," the algorithm loops back to make a selection of the next Cx sub-dataset to be processed. If the answer to that inquiry is "no," then the error decoding is finished for all sub-datasets Cx, and the main process is continued.

As noted above, in the aforementioned iteration, there is an inquiry as to whether the code word is correctable. If the answer to that inquiry is "yes," then the algorithm proceeds to calculate the symbol error positions and check whether the calculated error positions are valid positions in the erasure map. If the error positions are not valid, a decoding error has occurred, and this decoding step is ignored and no corrections are made and no error deductions from the erasure map occur. The algorithm then proceeds to the aforementioned inquiry as to whether there are more code words in the sub-dataset to be processed.

If the error position is valid, the errors in the code word are corrected, and the erasure map is updated by deducting the corrected errors from the map. The algorithm then again proceeds to the inquiry as to whether there are more code words in the sub-dataset to be processed.

Figure 7:
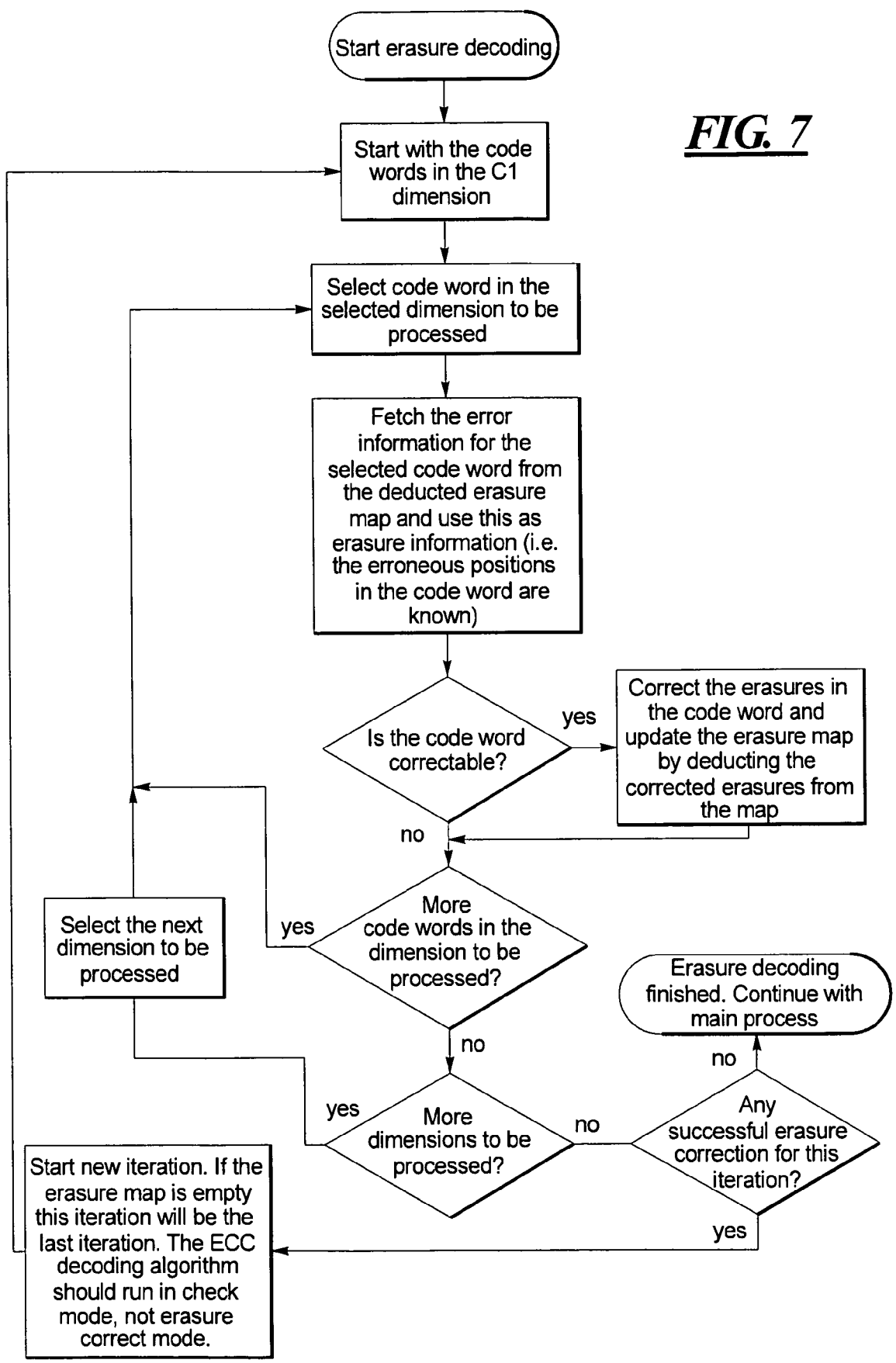
FIG. 7 is a flowchart of an embodiment of the erasure decoding sub-process in the inventive iterative algorithm.

The erasure-decoding algorithm is illustrated in a flowchart in FIG. 7. The erasure decoding algorithm is started with the code words in the C1 dimension, and a code word in that dimension is selected for processing. The error information for the selected code word is fetched from the deducted erasure map, and this information is used as erasure information since the erroneous positions in the code word are known.

An inquiry is then made as to whether the code word is correctable. If the code word is correctable, the erasures in the code word are corrected, and the erasure map is updated by deducting the corrected erasures from the erasure map. The algorithm then proceeds to inquire whether there are more code words in the dimension to be processed.

If the code word is not correctable, the algorithm again proceeds to this same inquiry as to whether there are more code words to be processed. If the answer is "yes," the algorithm loops back to select the next code word in the selected dimension and the aforementioned process is iterated again.

If there are no more code words in the dimension to be processed, an inquiry is made as to whether there are more dimensions to be processed. If so, the next dimension to be processed is selected, and the algorithm loops back to select the first code word in the selected dimension to be processed, and the aforementioned iteration is again done.

If there are no more dimensions to be processed, an inquiry is made as to whether any successive erasure correction occurred in the iteration that was just performed. If the answer is "no," the erasure decoding process in concluded, and the main process continues.

If a successful erasure correction in the iteration occurred, then a new iteration is started. If the erasure map is empty, this iteration will be the last iteration. The ECC decoding algorithm runs in a check mode, rather than an erasure correct mode. The new iteration begins with the code words in the C1 dimension at the beginning of the algorithm shown in FIG. 7.

Figure 8:
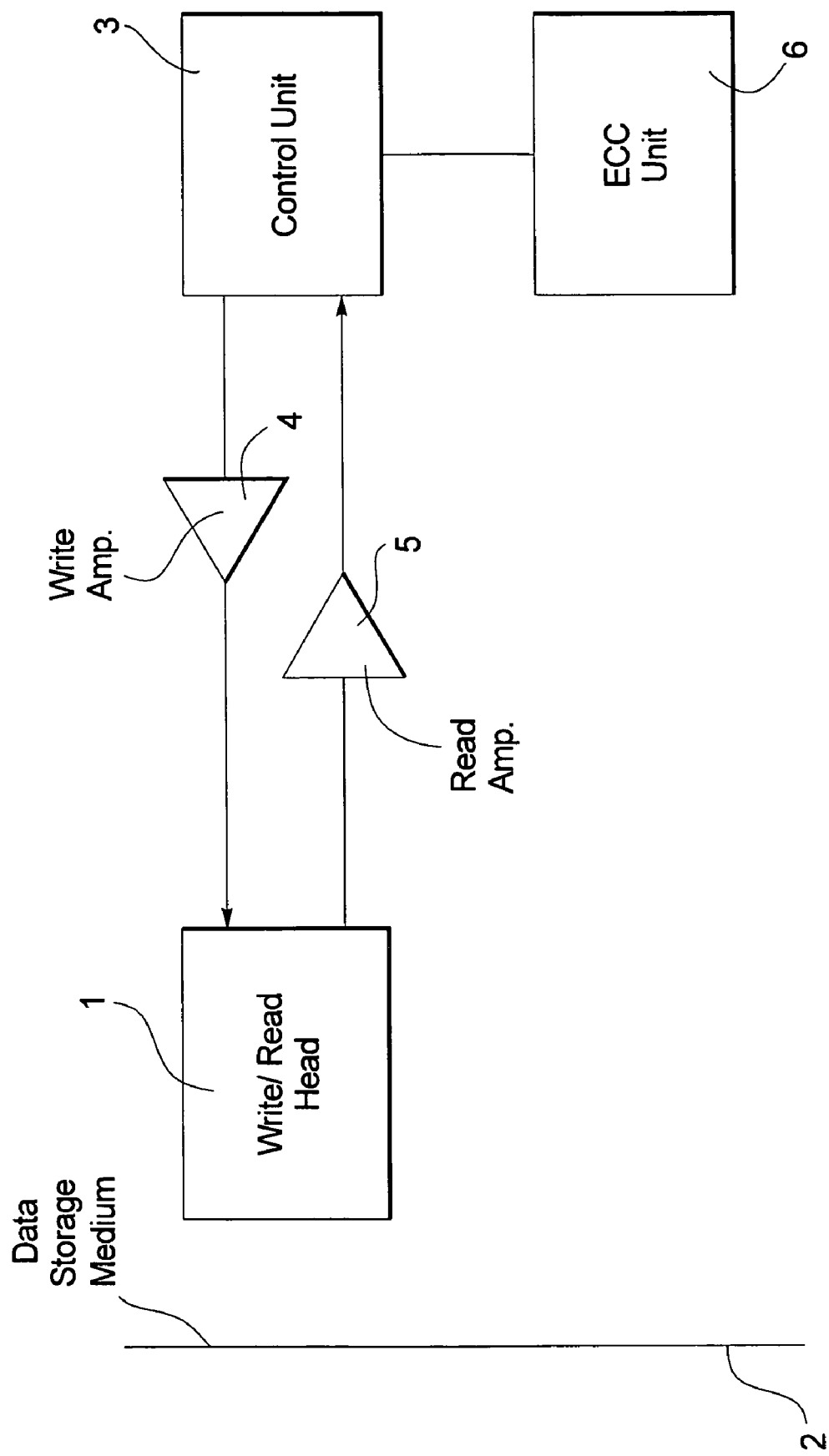
FIG. 8 is a block diagram of an apparatus in accordance with the invention, operating in accordance with the inventive iterative algorithm.

A basic block diagram of an apparatus for implementing the aforementioned procedure is shown in FIG. 8. The apparatus includes a write/read head 1 that interacts with a data storage medium 2 in a known manner to write digital data on and read digital data from the data storage medium 2. For this purpose, the write/read head 1 is in communication with a control unit 3 via a write amplifier for that is operational in a write mode, and a read amplifier 5 that is operational in a read mode. The control unit 3 is in communication with an ECC unit 6, wherein the method described above is performed.

Although modifications and changes may be suggested by those skilled in the art, it is the intention of the inventor to embody within the patent warranted hereon all changes and modifications as reasonably and properly come within the scope of his contribution to the art.

I claim as my invention:

1. A method for correcting errors in a dataset read from a storage medium, comprising the steps of:
    (a) reading a dataset that contains errors from a storage medium;
    (b) storing the dataset in a memory as a multi-dimensional first memory structure;
    (c) applying an iterative decoding and error correcting algorithm to said first memory structure in all dimensions until at least one first predetermined stop criterion is satisfied;
    (d) constructing a multi-dimensional first error map of any remaining errors in said first memory structure said first error map having dimensions corresponding to said multi-dimensional first memory structure and map coordinates defined by said dimensions, said remaining errors in said first memory structure being identified by respective map coordinates thereof in said first error map;
    (e) re-reading said dataset from said medium and constructing a multi-dimensional second error map representing said errors in said dataset, said second error map having dimensions corresponding to said multi-dimensional second memory structure and map coordinates defined by said dimensions, said remaining errors in said second memory structure being identified by respective map coordinates thereof in said second error map, and storing the re-read dataset as a multi-dimensional second memory structure, together with said second error map;
    (f) applying said iterative decoding and correcting algorithm to said second memory structure in all dimensions until at least one second predetermined criterion is satisfied;
    (g) constructing a multi-dimensional new second error map representing any remaining errors in said second memory structure;
    (h) comparing said new second error map and said first error map to identify map coordinates of transferable data that are correct in said new second error map but are incorrect in said first error map;
    (i) transferring, into said first error map, said transferable data according to the map coordinates thereof, and updating said first error map to obtain an updated first error map, and updating said first data structure by removing errors therefrom indicated by said updated first error map, to obtain an updated first data structure;
    (j) applying said iterative decoding and correcting algorithm in all dimensions to said updated first data structure; and
    (k) repeating steps (e) through (j) until a third predetermined stop criterion is satisfied.

2. A method as claimed in claim 1 comprising storing said dataset in step (b) as a three-dimensional first memory structure, and storing the re-read dataset in step (e) as a three-dimensional second memory structure.

3. A method as claimed in claim 1 comprising using the same at least one stop criterion as said first stop criterion in step (c) and at said second stop criterion in step (f).

4. A method as claimed in claim 1 comprising using a predetermined number of repetitions as said third stop criterion in step (k).

5. A method as claimed in claim 1 comprising using a stop criterion of no remaining errors left in said updated first memory structure as said third stop criterion in step (k).

6. A method as claimed in claim 1 comprising, after step (a), generating an initial error map representing said errors in the dataset read in step (a) and storing said initial error map in step (b), together with said first memory structure, and generating said first error map in step (d) by removing errors in said initial error map that are identified in step (c).

7. A method as claimed in claim 6 wherein each of first memory structure and said second memory structure comprises three dimensions C1, C2 and C3 each comprising a plurality of sub-datasets, and comprising applying an iterative decoding and correction algorithm in each of steps (c), (f) and (j) comprising the steps of:

(1) generating an erasure map in three dimensions corresponding to C1, C2, and C3;
initiating said error map using said erasure map as a starting point;

(2) for all C2 sub-datasets, processing each sub-dataset from a first to a last number of code words therein and, for each code word, determining whether that code word is correctible and, if so, calculating error positions therein and checking said error positions for correspondence to said erasure map and, if a mismatch occurs, indicating occurrence of a decoding error and, if a match occurs, removing non-erroneous symbols from said erasure map and, if that code word is not correctible, continuing with a next code word in the C2 sub-datasets;

(3) for all C3 sub-datasets, processing each sub-dataset from a first to a last number of code words therein and, for each code word, determining whether that code word is correctible and, if so, calculating error positions therein and checking said error positions for correspondence to said erasure map and, if a mismatch occurs, indicating occurrence of a decoding error and, if a match occurs, removing non-erroneous symbols from said erasure map and, if that code word is not correctible, continuing with a next code word in the C3 sub-datasets;

(4) for each code word in each of said dimensions C1, C2 and C3, retrieving respective error positions for that code word from step (2) and determining whether that code word is correctible with erasure information in said erasure map and, if so, correcting that code word and, if not, continuing to a next code word; and repeating steps (1)-(4) as long as code words continue to be corrected.

8. A data storage system with error correction, that interacts with a data storage medium, comprising:

a read head adapted to interact with said data storage medium;

a control unit connected to said read head that operates said read head to read data from said data storage medium; and an error correction unit connected to said control unit that operates on said data read by said read head to correct errors therein by (a) reading a dataset that contains errors from a storage medium, (b) storing the dataset in a memory as a multi-dimensional first memory structure, (c) applying an iterative decoding and error correcting algorithm to said first memory structure in all dimensions until at least one first predetermined stop criterion is satisfied, (d) constructing a multi-dimensional first error map of any remaining errors in said first memory structure, said first error map having dimensions corresponding to said multi-dimensional first memory structure and map coordinates defined by said dimensions, said remaining errors in said first memory structure being identified by respective map coordinates thereof in said first error map (e) re-reading said dataset from said medium and constructing a multi-dimensional second error map representing said errors in said dataset, said second error map having dimensions corresponding to said multi-dimensional second memory structure and map coordinates defined by said dimensions, said remaining errors in said second memory structure being identified by respective map coordinates thereof in said second error map, and storing the re-read dataset as a multi-dimensional second memory structure, together with said second error map, (f) applying said iterative decoding and correcting algorithm to said second memory structure in all dimensions until at least one second predetermined criterion is satisfied, (g) constructing a multi-dimensional new second error map representing any remaining errors in said second memory structure, (h) comparing said new second error map and said first error map to identify map coordinates of transferable data that are correct in said new second error map but are incorrect in said first error map, (i) transferring, into said first error map, said transferable data and updating said first error map to obtain an updated first error map, and updating said first data structure by removing errors therefrom indicated by said updated first error map, to obtain an updated first data structure, (j) applying said iterative decoding and correcting algorithm in all dimensions to said updated first data structure; and (k) repeating (e) through (j) until a third predetermined stop criterion is satisfied.

9. A data storage system as claimed in claim 8 wherein said error correction unit stores said dataset in (b) as a three-dimensional first memory structure, and stores the re-read dataset in step (e) as a three-dimensional second memory structure.

10. A data storage system as claimed in claim 8 wherein said error correction unit uses the same at least one stop criterion as said first stop criterion in (c) and at said second stop criterion in (f).

11. A data storage system as claimed in claim 8 wherein said error correction unit stores a predetermined number of repetitions as said third stop criterion in (k).

12. A data storage system as claimed in claim 8 wherein said error correction unit uses a stop criterion of no remaining errors left in said updated first memory structure as said third stop criterion in (k).

13. A data storage system as claimed in claim 8 wherein said error correction unit, after (a), generates an initial error map representing said errors in the dataset read in (a) and stores said initial error map in (b), together with said first memory structure, and generates said first error map in (d) by removing errors in said initial error map that are identified in (c).

14. A data storage system as claimed in claim 13 wherein each of first memory structure and said second memory structure comprises three dimensions C1, C2 and C3 each comprising a plurality of sub-datasets, and wherein said error correction unit applies an iterative decoding and correction algorithm in each of (c), (f) and (j) by (1) generating an erasure map in three dimensions corresponding to C1, C2, and C3, (2) initiating said error map using said erasure map as a starting point, (3) for all C2 sub-datasets, processing each sub-dataset from a first to a last number of code words therein and, for each code word, determining whether that code word is correctible and, if so, calculating error positions therein and checking said error positions for correspondence to said erasure map and, if a mismatch occurs, indicating occurrence of a decoding error and, if a match occurs, removing non-erroneous symbols from said erasure map and, if that code word is not correctible, continuing with a next code word in the C2 sub-datasets, for all C3 sub-datasets, processing each sub-dataset from a first to a last number of code words therein and, for each code word, determining whether that code word is correctible and, if so, calculating error positions therein and checking said error positions for correspondence to said erasure map and, if a mismatch occurs, indicating occurrence of a decoding error and, if a match occurs, removing non-erroneous symbols from said erasure map and, if that code word is not correctible, continuing with a next code word in the C3 sub-datasets; for each code word in each of said dimensions C1, C2 and C3, retrieving respective error positions for that code word from (2) and determine whether that code word is correctible with erasure information in said erasure map and, if so, correct that code word and, if not, continue to a next code word, and repeating (1)-(4) as long as code words continue to be corrected.

* * * * *